July 7, 1964

J. I. DASPIT 3,140,391

APPARATUS FOR GROUND COMPUTED RADIAL NAVIGATION

Filed June 29, 1959

INVENTOR
JOHN I. DASPIT

BY

ATTORNEY

July 7, 1964 J. I. DASPIT 3,140,391
APPARATUS FOR GROUND COMPUTED RADIAL NAVIGATION
Filed June 29, 1959 4 Sheets-Sheet 2
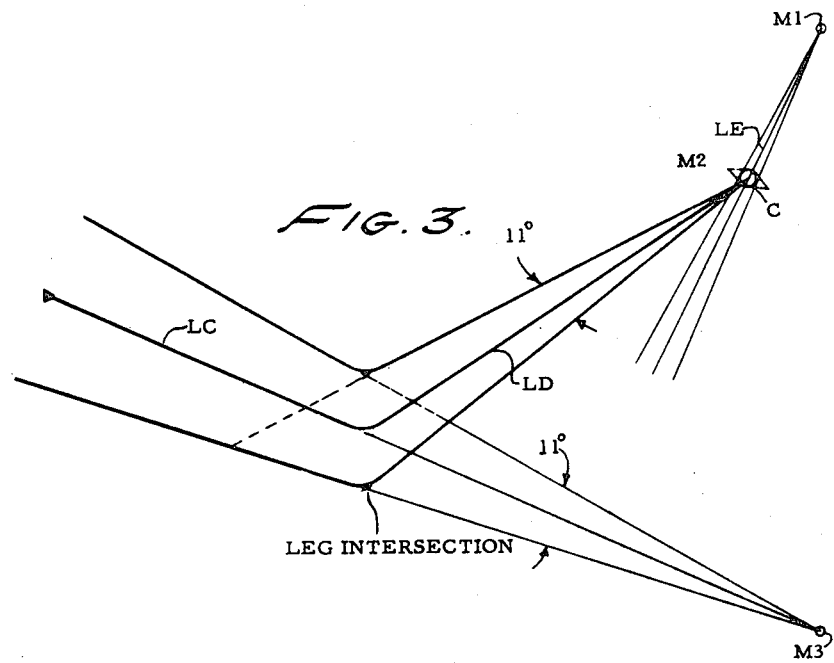
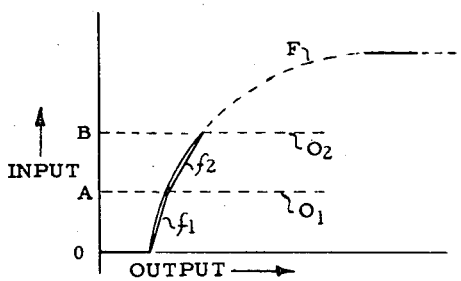
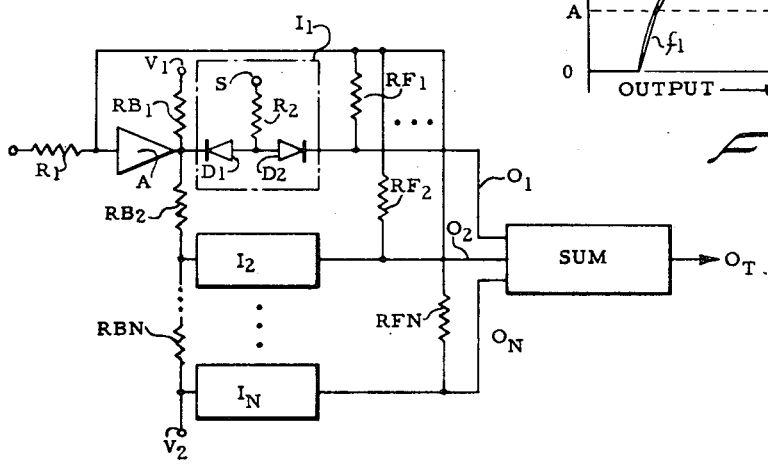
INVENTOR
JOHN I. DASPIT
BY
ATTORNEY

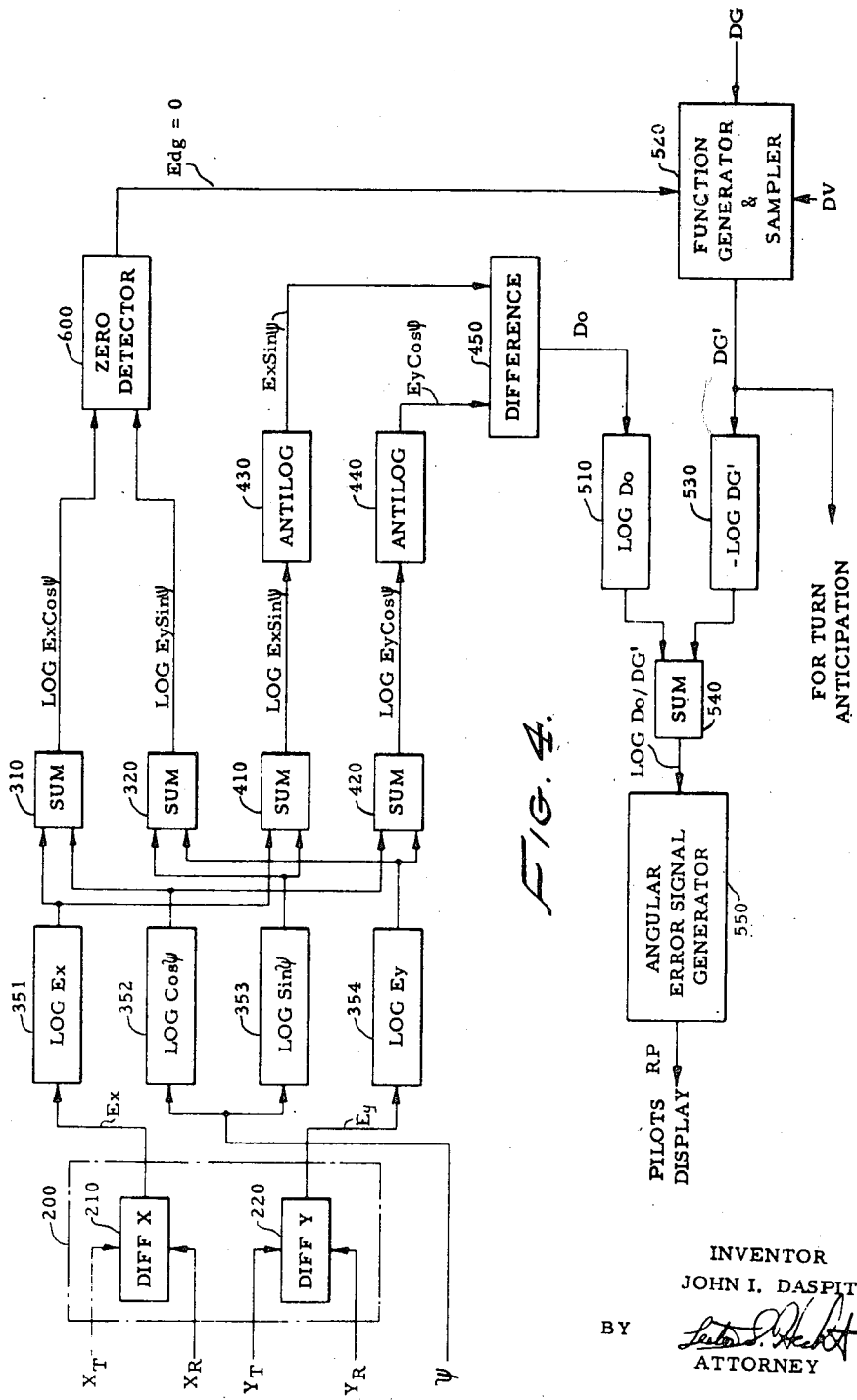

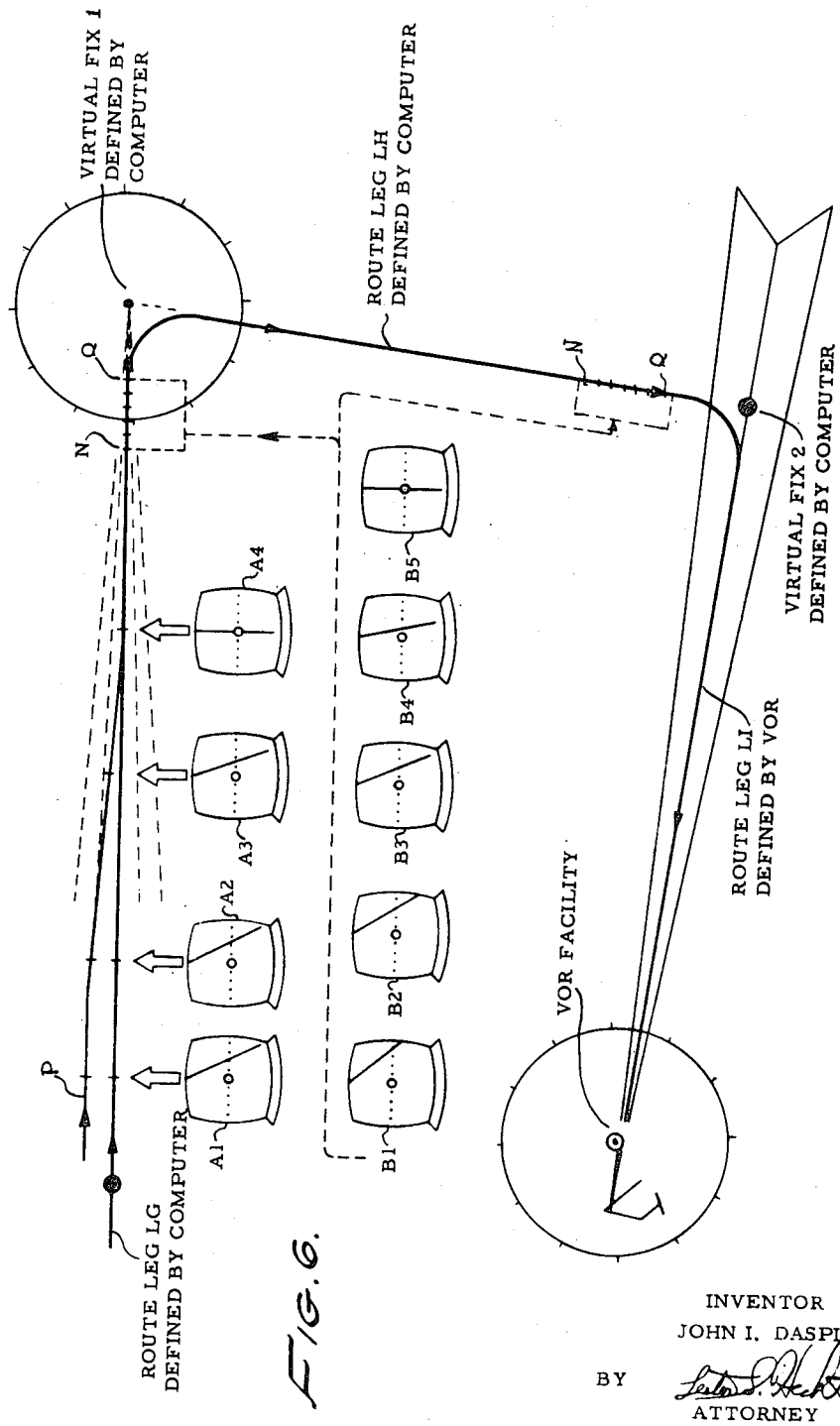

Patented July 7, 1964

1

3,140,391
APPARATUS FOR GROUND COMPUTED
RADIAL NAVIGATION
John I. Daspit, Los Angeles, Calif., assignor to Tasker
Instruments Corporation, Hollywood, Calif.
Filed June 29, 1959, Ser. No. 823,514
4 Claims. (Cl. 235—151)

This invention relates to a method and appropriate apparatus for air traffic control and, in further particular, to a system wherein radar information defining the position of an aircraft with respect to a ground station is translated by means of a computer on the ground into air traffic control information indicating the radial error of the aircraft measured between the leg of the aircraft route and a line connecting the aircraft position to a "virtual fix" or turning mark. This information may then be relayed to the various aircraft by means of radio transmission.

The present invention has been devised as a supplement for the existing navigation system referred to as "omni" or very high frequency omni-range navigation, which may be abbreviated hereinafter as VOR. In this conventional system various omni-range facilities are established, each of which transmits angular data information. The VOR system permits a pilot to determine his approximate error in degrees with respect to the omni transmission point. No provision is made to enable the pilot to determine his distance from the VOR transmission point and, in fact, a null exists directly over the VOR transmission point so that the pilot cannot tell that he is exactly at the transmission point.

Considerable uncertainty of path has been experienced with the present VOR system which is employed by the civil airways within the transition and terminal areas of navigation. In the past these uncertainties have been tolerable because VOR was relied upon mainly to keep the aircraft within confines of the established airway, which typically is ten miles wide. At the present time, however, the problem of air navigation has become merged with that of air traffic control, due to an increase of air traffic in terminal areas, and accurate scheduling along airways has become necessary. The VOR system may cause path uncertainties along an air traffic route which will result in uncertainties of distance sufficiently large to cause an aircraft to fly beyond operational tolerance in terms of time schedule. It will be shown in one example of the description which follows that uncertainties in the order of one-half to one minute in flying time to touchdown may occur in the VOR navigation system, which are not permissible in a system of high density air traffic control.

One reason for the uncertainty which exists in the present VOR system is the fact that many of the aircraft route leg junctions occur at points which may be determined only by the intersections of radials from two or more VOR transmitting stations. The present VOR technique suffers from an approximate 5.7° angular error in determination of a radial during five percent of the time under typical conditions. Thus a "fix" defined by the intersection of two such VOR radials is in reality an area enclosed by the radials of two VOR stations which are ±5.7° to either side of the indicated radials. If the two VOR stations are each 20 miles away from the intersection of the radials, the foregoing area of uncertainty is a quadrilateral having sides approximately two miles long. This uncertainty in location of the turning point to a new leg of the air traffic route leads to uncertainties in the distance and/or the time to fly to touchdown.

A further error in the existing system is caused by the so-called "cone of silence" which exists directly above the VOR transmitter. This can cause an appreciable

2 error in the location of the turning fix immediately above a VOR facility. The diameter of this cone is in the order of three nautical miles for an aircraft at an altitude of 12,000 ft.

One partial solution to the need for more precise navigation has been referred to as "eyeballing." This is a process of visual examination by the operator of the radar display on which the standard routes to a particular aircraft terminal are plotted, and on which radar returns from approaching aircraft appear. The controller estimates the position of the aircraft, and provides voice advisory information to the pilot to enable the pilot to fly more nearly along the center of the assigned route. By this method some of the schedule uncertainty in the VOR system can be reduced, and a more accurate control of the time to touchdown can be realized.

"Eyeballing" is undesirable because the accuracy thereof is relatively poor unless the controller devotes an excessive amount of time and effort to observation and decision. Furthermore, "eyeballing" is undesirable for obtaining a high degree of aircraft acceptance to an airport because of the excessive repetition which is required in equipment and personnel. For a busy airport, an "eyeballing" control system would necessitate many additional radar displays, additional controllers, and additional radio channels. Furthermore, the accuracy of the "eyeballing" technique at its best is suspect because of limitations in existing equipment and the limitations of human operators.

Another disadvantage of the present system is that the VOR information is not available to all aircraft, since many of the smaller aircraft do not have the specialized airborne receivers which are necessary in the VOR system. This can, of course, present a very major problem, since even the smallest of aircraft can cause a great deal of difficulty in air traffic control when interfering with the route of another. The present invention has been developed to obviate the above disadvantages of existing navigation systems, the objects being generally as follows:

To provide a navigation system which will permit precise adherence to an assigned time schedule.

To obviate, or reduce to a minimum, speed adjustments, path stretch maneuvers, stacking, and other procedures which are caused by path uncertainty in navigation systems.

To provide a navigation system which is available to all aircraft, without the need for expensive airborne receivers or display units other than those already utilized.

To permit the establishment of a "virtual fix" anywhere within the area of radar and communication coverage.

To provide an improved navigation system utilizing available cockpit indicators and standing operating procedures as developed for VOR.

To permit precise turn anticipation and continuous navigation control without the disadvantage of the "cone of silence" or radial intersection errors inherent in VOR.

According to the basic method of the invention the above objects are obtained by developing a "virtual fix" which becomes the center or vertex of a family of radials emanating therefrom and encompassing the scheduled route for an aircraft to be controlled. As the aircraft flies along a leg toward the "virtual fix" a computer located on the ground determines which radial the aircraft is positioned upon. If the aircraft in question is flying along the center line of the assigned route the radial position information sent to the pilot will be "on course." If, on the other hand, the aircraft is not on the assigned route center line but is laterally displaced from it, data will be sent to the pilot indicating the angular offset, so that he may head toward the "virtual fix" by altering his heading in such a way as to fly a constant radial toward the fix, or to change his course appropriately in order to come onto the scheduled route center line.

In the preferred embodiment of the invention the computing technique is employed whereby the scheduled flight of a particular aircraft is simulated in fast time from touchdown along the assigned route. Signals $X_R$ and $Y_R$ developed by the system of the copending application may be employed according to the present invention to produce error signals E$x$ and E$y$ which indicate the differences in X and Y coordinates between the simulated flight position during computation and the actual aircraft position as represented by radar tracking signals $X_T$ and $Y_T$. Means are provided according to the present invention for generating an "along-route" error signal, referred to herein as E$dg$, which indicates the distance between the simulated aircraft position and the actual position of the aircraft during computation. When signal E$dg$ is equal to zero the simulated aircraft position is at the foot of a perpendicular drawn from the actual aircraft position to its route center line.

When the simulated aircraft position is at the foot of the perpendicular mentioned above, the offset distance between the actual aircraft position and its route, referred to herein as distance D$o$, may be most accurately computed. Accordingly, the invention provides means responsive to a signal indicating that error E$dg$=0 for computing signal D$o$ at that time; and also includes circuits for determining the distance DG′ which is measured from the actual aircraft position along a line parallel to the scheduled aircraft route to a line which runs perpendicular to the scheduled route and through the next virtual fix point. Signals DG′ and D$o$ may then be translated into the radial-representing signal mentioned above which indicates the path the aircraft could follow to radially approach the virtual fix, or signals DG′ and D$o$ may be interpreted directly as an offset error which the pilot may desire to correct immediately.

The distance-to-virtual-fix signal information is also useful since it may be employed as "turn-anticipation" information. The pilot may then start his turn at a predetermined distance from the virtual fix in order to turn at a radius of flight which will permit him to complete his turn on course.

While the technical discussion which follows will be concerned principally with the preferred system of the invention it will be understood that the general method disclosed herein is applicable as well to other systems. For example, in lieu of the fast time simulating technique, the radial error signals may be developed as a direct trigonometric function computed from the actual position coordinates and the virtual fixed coordinates. This may be done by means of either an analogue or a digital computer. Furthermore, the schedule error may be determined either by means of the simulating technique or as a direct function of the difference between the scheduled position and the actual position of the aircraft.

In the preferred structural embodiment of the invention tracked radar signals $X_T$ and $Y_T$ indicating the actual position of an aircraft to be navigated are combined with computed schedule position signals $X_R$ and $Y_R$ and translated by means of an error signal generator into X and Y error signals E$x$ and E$y$. Signals E$x$ and E$y$ are applied to along-route and offset error signal generators producing signals E$dg$ and D$o$, respectively. Signal E$dg$ represents the distance along the route between the scheduled position during the fast-time flight simulation and the actual aircraft position as represented by the radar tracking signals. Signal D$o$ represents the offset or perpendicular displacement of the actual aircraft position from the route.

Signal E$dg$ is sensed by zero detector to determine the condition E$dg$=0, at which time a pulse is generated to control the operation of a radial position error signal generator, which also receives signal D$o$ and signal DG′. Signal DG′ is developed by a distance-to-virtual-fix generator, which receives signal DG representing the total distance-to-go along the simulated flight from touchdown. The radial position error signal generator then produces an output signal RP which represents the radial error from the virtual fix. The pulse representing the condition E$dg$=0 is also applied to an actual time to fly generator which produces signal A$tf$. Signal A$tf$ may simply be a direct reproduction of the pulse representing condition E$dg$=0 if the digital technique for schedule error generating is employed. According to this technique, simulated fast time pulses are counted until the simulated time from touchdown is equal to the scheduled time remaining. As soon as this occurs a pulse S$tf$ is generated. A counter is provided then which counts up or down depending upon the order of occurrence of pulse A$tf$ and S$tf$. The count then represents the difference in terms of a digital number between the time occurrence of signal A$tf$ and S$tf$, which is utilized to produce an output signal E$tf$ representing the schedule error.

This digital technique is not essential to the present invention. In lieu of this it may be preferred to employ an analogue signal representation of the actual time to fly A$tf$. This may be accomplished by utilizing a sweep generator which produces an output signal increasing in value until the condition E$dg$=0, at which time the amplitude of the sawtooth signal may be sampled and stored and compared with a sawtooth signal S$tf$ generated in a similar manner to represent the scheduled time to fly. These two analogue signals may then be compared to produce an output analogue signal representing the schedule error E$tf$.

The novel features which are believed to be characteristic of the invention, both as to its organization and method of operation, together with further objects and advantages thereof will be better undersood from the following description considered in connection with the accompanying drawings. It is to be expressly understood, however, that the drawings are for the purpose of illustration and description only and are not intended as a definition of the limits of the invention.

FIG. 3 shows a typical air traffic control situation as it presently exists utilizing VOR and ADF navigation;

FIG. 4 is a block diagram of a suitable arrangement for means 200 through 500 of FIG. 1;

FIG. 5 is a partial schematic diagram of a suitable arrangement for the log function generators of FIG. 4;

FIG. 5A is a graph showing the manner in which the circuit of FIG. 5 operates;

FIG. 6 illustrates the general method of the invention in a typical air traffic control application.

Figure 1:
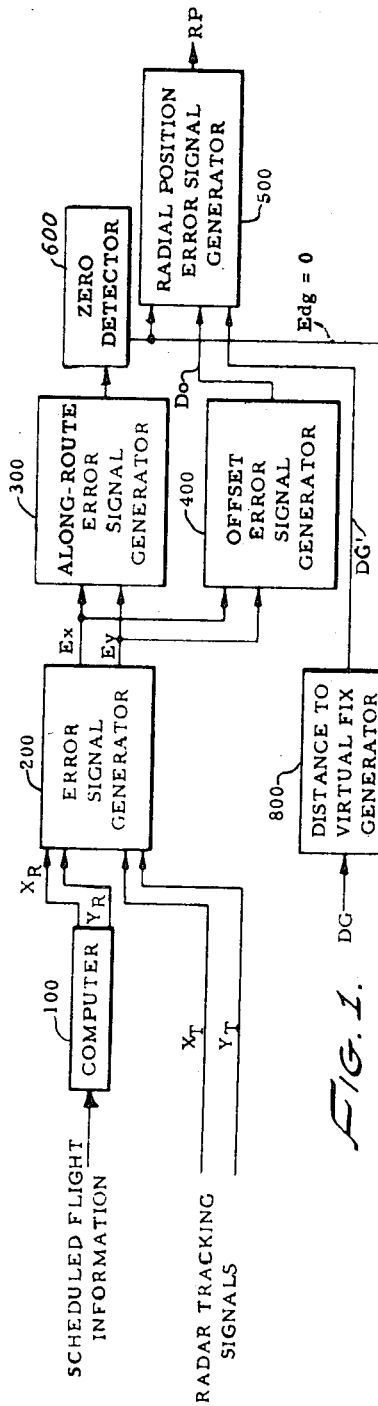
FIG. 1 is a block diagram of one embodiment of the invention.

Reference is now made to FIG. 1 wherein the invention is shown in block diagram form. As indicated therein scheduled flight information is applied to a computer 100, which produces output signals $X_R$ and $Y_R$ representing the simulated position of an aircraft. This position is represented by a (.) dot so identified in FIG. 2 along a route.

Figure 2:
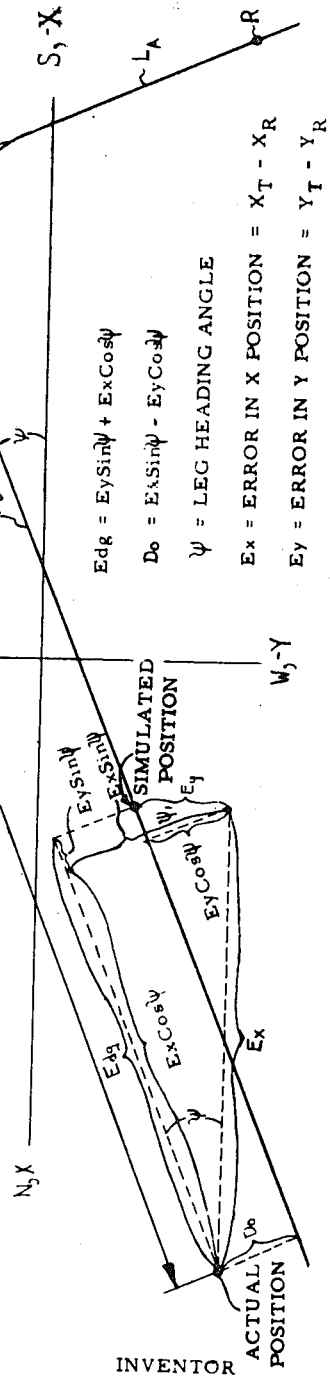
FIG. 2 illustrates graphically the method of computation introduced by the invention.

Signals $X_R$ and $Y_R$ are applied to an error signal generator 200 which also receives tracked signals $X_T$ and $Y_T$ identifying the actual position of the aircraft. The actual position of the aircraft is also illustrated in FIG. 2 as a block dot. The error signal generator 200 produces output signals E$x$ and E$y$ which are applied to an along-route error signal generator 300 and to an offset error signal generator 400. Generators 300 and 400 are arranged to perform the computation indicated in FIG. 2 to produce signals E$dg$ and D$o$, respectively. As indicated in FIG. 2 signal E$dg$=E$y$ sin $\psi$+E$x$ cos $\psi$, and signal $$Do = Ex \sin \psi - Ey \cos \psi$$

Signal E$dg$ is applied to a zero detector 600 which produces a pulse for actuating a radial position error signal generator 500 and an actual time to fly generator 700. When E$dg$ is equal to zero the simulated position of the aircraft in simulated flight is adjacent to the actual position of the aircraft in real flight. By that it is meant that a perpendicular drawn from the actual position of the aircraft to its schedule route will pass through the simulated aircraft position at that time in simulated flight. Consequently the pulse representing the condition E$dg$ may be employed to actuate a generator 500 to produce output signal RP as a function of the distance from the actual position referred to as DG' and the displacement of the actual position from the route.

FIG. 2 shows the mathematical relations between the signals described above and the actual position of an aircraft in relation to a real route and its simulated position thereon. The route is shown as having two legs, $L_A$ and $L_B$, and a reference point R, from which schedule errors are computed. The route leg $L_B$ occupied by the aircraft is shown intersecting the X axis, which may lie in the N-S direction, at an angle $\psi$.

The simulated position for the aircraft can be derived by the computing simulating technique or by other methods. If the former method is employed, the X and Y coordinates of the simulated position are taken from a coordinate function generator which produces output signals X and Y indicating the simulated position of the aircraft at any time with respect to a reference point on the route. The simulated position indicates where the aircraft should be, at that particular time, if it is to reach the reference point D exactly at the scheduled time. If the aircraft's actual position is behind the simulated position, it will arrive late unless corrections are made. If the aircraft's actual position is ahead of the simulated position, it will arrive early.

Although the simulating system is preferred for its adaptability, speed, and simplicity; many other methods and devices may be used for deriving simulated position coordinates. Since the scheduled flight path, scheduled airspeeds, and scheduled time of arrival at the reference point are known in advance, it is a relatively simple matter to construct a computer which will indicate, at any given time, where the aircraft should be on its flight path to reach the reference point exactly on schedule. Thus signals $X_R$ and $Y_R$, which indicate the scheduled position of the aircraft at any time with respect to arrival at reference point D at a predetermined time, may be taken directly from the system of my copending application, or may be generated in a computer 100 constructed in accordance with well known computer techniques to produce such signals.

The virtual fix point is represented by the X and Y coordinates at the intersection of leg $L_A$ and $L_B$, which, of course, depend upon the geographic location of the legs. And the actual position of the aircraft is represented by signals $X_T$ and $Y_T$ from a tracking radar, or some other suitable location detecting device. The along-route error signal E$dg$ and the offset error signal D$o$ are related to these quantities by the trigonometric relations shown.

FIG. 4 shows a suitable arrangement for error signal generator 200, along route error signal generator 300, offset error signal generator 400, and radial position error signal generator 500, all disclosed in FIG. 1. Error signal generator 200 comprises two subtraction circuits, 210 and 220, which receive input signals $X_T$, $X_R$ and $Y_T$, $Y_R$, respectively, and produce error signals E$x$ and E$y$ as defined in FIG. 2. Along route signal generator 300 comprises log function generators 351, 352, 353, and 354; and summing circuits 310 and 320. Summing amplifiers 310 and 320 form signals representing log [E$x$ cos $\psi$] and log [E$y$ sin $\psi$], as indicated. A signal representing E$dg$ could be generated from these two signals by adding them together and taking the antilog thereof, but in this embodiment of the invention it is only desired to detect the condition where E$dg$=0, so the output signals of summing circuits 310 and 320 are applied directly to zero detector 600, as shown in FIG. 4. As each of the two terms of E$dg$ approach the minimum value separately, the logarithms thereof approach zero separately, and zero detector 600 is operable to produce an output signal when the sum of the logarithm signals is equal or less than a value which, for all practical purposes, indicates the condition E$dg$=0. The output signal from detector 600 thus indicates approximately zero for signal E$dg$, but since the limits of approximation can be set to the required problem accuracy, no significant inaccuracy is introduced by the approximation.

The output signal from zero detector 600 is applied to function generator 520, which operates to produce a signal DG' representing the distance of the aircraft from its virtual fix point. Signal DG' may be derived from a signal DG, which represents the distance along the flight path between the aircraft's actual position and reference point R, by subtracting therefrom a signal DV, which represents the distance along the flight path between the virtual fix point and reference point R. Signal DG may be derived directly from the system of my copending application, or may be computed by well known techniques from tracking signals $X_T$ and $Y_T$. Signal DV, of course, is a constant for each pair of virtual fix and reference points, and it can be preset by well known techniques. Signal DG' is utilized to generate a radial position error signal, along with signal D$o$, which is generated in offset error signal generator 400.

Offset error signal generator 400 comprises summing circuits 410 and 420, antilog function generators 430 and 440, and difference circuit 450. Summing circuits 410 and 420 generate signals representing log [E$x$ sin $\psi$] and log [E$y$ cos $\psi$], respectively, which are translated into signals representing E$x$ sin $\psi$ and E$y$ cos $\psi$ in antilog function generators 430 and 440. The output of the antilog generators 430 and 440 are subtracted in difference generator 450 to produce a signal representing D$o$, in accordance with the equation shown in FIG. 2.

A signal RP representing the angular positional correction the pilot must make to fly along his assigned route center line toward the virtual fix point is generated from signals D$o$ and DG' in radial position error signal generator 500, which comprises log generators 510 and 530, summing circuit 540, and angular error signal generator 550. From FIG. 2 it can be seen that the radial error will equal the angle between a line drawn from the virtual fix point to the aircraft and the route leg $L_A$. It is apparent that the tangent of this angle is equal to D$o$ divided by DG', so that the angle may be computed by taking the arctan of D$o$/DG'. The log of D$o$/DG' is formed in summing circuit 540 by adding together the signals from log generators 510 and 520, which represent log D$o$ and −log DG', respectively. The radial position error signal RP is derived directly from log D$o$/DG' in angular error signal generator 550, which is operable to produce an output signal proportional to the arctan of the antilog of the input signal thereto. Error signal RP might alternately be generated by taking the antilog of log D$o$/DG' and applying it to a standard arctan generator. Error signal RP, which represents the angular correction the pilot must make to steer onto the route leg. The radial error signal may be transmitted to the pilot by voice communication or by other suitable methods such as narrow band data link. If the aircraft is equipped with VOR receivers, the radial error signal last transmitted may be displayed during the interval between transmissions on the VOR localizer, which, in existing VOR systems, is adapted to display radial position error signals. When a radial error signal is received the pilot may, at his option, steer onto his preassigned flight path by turning to reduce the radial error signal to zero, or alternately fly directly toward the up-coming virtual fix point by flying in such manner as to hold the radial error signal constant. In the latter case, the aircraft will remain off-course until reaching the fix point, but it will travel to the fix point by the shortest path.

FIG. 5 shows a function generator circuit which may be utilized for the following circuits disclosed in FIG. 4: log generators 351, 352, 353, 354, 510, and 530; antilog generators 430 and 440; and generators 520 and 550. This function generator circuit, which is disclosed in co-pending application Serial No. 807,608, filed April 20, 1959, by Wendell B. Sander, for Function Generator Circuits, now Patent No. 2,976,430, is preferable because of its versatility and simplicity, but it should be understood that the above-noted circuits may be embodied by many other techniques well known in the art.

Referring to FIG. 5, the above-noted function generator comprises an operational amplifier A, input impedance $R_1$, an output intervalizer comprising sections $I_1 \ldots I_n$, interval feedback resistors $RF1 \ldots RFN$, and an output summing circuit. Each intervalizing section $I_1 \ldots I_n$ contains a voltage source S, resistor $R_2$, and diodes $D_1$ and $D_2$, connected as shown. Each intervalizing section is biased to be cutoff until the output of amplifier A exceeds a preset lower level, then to open and pass the amplifier output until a preset upper level is reached, when the section again cuts off but maintains a constant voltage output equal to the cut off level. Each section is biased to operate during one voltage interval of the input signal, and the output function in each interval is determined by the associated feedback resistor, $RF1 \ldots RFN$.

By appropriate choice of output interval increments and feedback resistors, any desired output function can be approximated, as illustrated in FIG. 5A, which shows the first two intervals in the approximation of an output function F. In the interval OA, section $I_1$ follows the input voltage by a function $f1$, which is determined by the value of feedback RF1. When the input signal reaches level A, section $I_1$ cuts off and maintains the voltage on output line $O_1$ constant at the A level, and section $I_2$ cuts in. Section $I_2$ follows the input voltage by a different function $f2$, which is determined by its feedback resistor RF2. When the input voltage reaches level B, section $I_2$ cuts out and section $I_3$ cuts in, and so on, with the function determined by each section preselected to approximate the curve F when added together.

Each individual section $I_1 \ldots I_n$ is biased by the internal source S and bias network $RB1 \ldots RBN$ to operate as follows: When the input signal is below the desired cut-in level, $D_1$ is back biased and $D_2$ forward biased. When the input signal reaches the desired cut-in level, $D_1$ conducts and $D_2$ remains conducting, thus placing resistor RF1 in the feedback loop. When the input signal reaches the desired cut-out level, $D_2$ becomes back biased, and the output thereof remains constant at the cut-out level until the input voltage again falls below the cut-out level.

The cut-in level for each section is, in the case of continuous functions, set to correspond to the cut-out level for the next lower section, so there will be no discontinuities in the output signal $O_T$ of the summing circuit. Thus as the input voltage to amplifier A rises from zero to maximum, the intervalizing sections $I_1$ through $I_n$ operate in sequence during their predetermined input interval; each contributing a linear function $f1 \ldots fN$ which, when added together, provide an approximation to any desired function F. It is obvious that this approximation can be made as accurate as desired by increasing the number of intervals thereein. It will be easily understood by those skilled in the art that this is accomplished by increasing the number of intervalizing sections and biasing each to operate in a narrower input interval.

The above described function generator can be utilized for all of the log, antilog, and special function generators in this invention. In the log and antilog generators the output function is set to approximate log and antilog functions. In angular error signal generator 550 the output function approximates the arctan of the antilog of the input, thereby combining the functions of an arctan and antilog generator.

FIG. 3 illustrates the uncertainty inherent in existing VOR navigation systems where the intersection of route legs are marked by intersecting VOR transmission beams or by VOR transmitters. In FIG. 3, legs LC, LD, and LE of a route are shown, along with three VOR transmitting facilities M1, M2, and M3. The "fix" defined for the intersection of legs LC and LD is the quadrilateral enclosed in dashed lines. As mentioned earlier, the sides of the quadrilateral may be approximately two miles long if stations M2 and M3 are each 20 miles away from the intersection.

The intersection of leg LD and LE is marked by a cone of silence C above VOR facility M2, which is approximately three nautical miles in diameter at 12,000 ft. The system of this invention eliminates the illustrated uncertainty by providing a definite fix point at the intersection of route legs, and furthermore may provide turn anticipation signals to allow aircraft to make smooth turns from one leg onto another without ever passing through the route leg intersections. Referring to FIGS. 2 and 4, a turn signal may be transmitted to the aircraft when it reaches point T on route leg $L_A$, so that the pilot can begin a standard turn which will bring him onto leg $L_B$. As the aircraft approaches leg $L_B$, radial error signals are generated to bring him exactly on route when the turn is completed. The turn signal is generated when distance-to-virtual-fix signal DG' has fallen to the value T, which is determined by the turning radius of the aircraft under guidance.

FIG. 6 shows a method whereby existing VOR cockpit localizers can be utilized in connection with this invention to provide continuous display of radial error signals and turn anticipation signals. Pilot's localizer A is shown at various times as an aircraft P steers onto its virtual route leg LG. A1 . . . A4 show the change in indication as the pilot steers onto the route leg at the points indicated.

The co-pilot's localizer B displays distance to turning point, which commences when the aircraft reaches point N and falls to zero when the aircraft reaches turning point Q. B1 . . . B5 show the change in indication as the aircraft travels between points N and Q on the flight path. After turning onto leg LH, the turn anticipation signals are again received when the aircraft approaches leg LI, which is defined by radiation from a VOR facility. After turning onto leg LI the aircraft is navigated by VOR signals as in the prior art. Thus it can be seen that this invention is compatible with existing VOR equipment and techniques, and that it can be used to provide virtual fix points anywhere in the radar coverage area without movement or installation of physical equipment, as an independent navigation system or as a supplement to existing VOR equipment.

In general terms, the essential features of this invention are (1) means for generating signals representing the geographical coordinates of points lying on a selected flight path; (2) means for generating signals representing the geographical coordinates of virtual fix points defined by the intersection of adjacent legs of said selected flight path; (3) means for generating signals representing the actual position of an aircraft flying along said selected flight path; (4) means for computing the displacement of the aircraft from said flight path; (5) means for generating an error signal proportional to said displacement, and (6) means for transmitting said error signal to said aircraft. In addition to the embodiments already described, means (1) can be embodied by programming, in the memory section of a computer, a series or continuum of ordered number pairs which represent the geographical coordinates of the selected route. Means (2) could also be embodied by the same method, and means (4) might be embodied in a computer which compares the signals representing actual position to the signals representing the flight path, and computes the difference between the position signal and the nearest route point signal. Many practical techniques are known to those skilled in the computer art for constructing computers of this general type.

Preferably, the invention also includes (A) means for computing the distance between the aircraft's actual position and the upcoming virtual fix point; (B) means for computing the angular displacement of the aircraft from its route with reference to the up-coming virtual fix point; and (C) means for generating turn anticipation signals as the aircraft approaches the up-coming virtual fix point. Means (A) can be embodied quite simply in a computer which compares the aircraft position signals to the appropriate virtual fix point signal and computes the distance therebetween. Means (B) can be embodied with equal ease in an arc tangent computer which determines the angle whose tangent equals the aircraft's displacement from its route divided by the aircraft's distance from the up-coming fix point. Means (C) can also be easily embodied in a signal generator which is triggered when the aircraft's distance to the up-coming fix point falls to a value determined by the aircraft in question.

For further refinement, the invention also preferably includes (a) means for generating signals representing simulated positions on the flight path which should be occupied by the aircraft at various times to insure arrival at some reference point at a predetermined time; (b) means for generating schedule error signals representing the displacement of the aircraft from its simulated position at various times; and (c) means for transmitting the schedule error signals to the aircraft. Means (a) through (c) are preferably embodied by the digital techniques, as described herein, but they may also be embodied by analog or other techniques. In the simplest form, means (a) may be embodied by manually computing; according to well known navigation principles, the scheduled positions of an aircraft at preset time intervals along a selected route, programming these signals in the memory section of a computer, with means, either manual or automatic, for adjusting the positions to compensate for wind changes along the flight path. Means (b) could be embodied in a computer which, at preset time intervals compares the actual position signals to the scheduled position signal for the corresponding time, and computes the lead or lag therebetween in terms of time, distance, or speed error signals.

From the foregoing description, it is apparent that this invention provides a navigation system available to all aircraft, which does not require expensive airborne receivers or new display equipment, but which can be easily adapted to existing navigation techniques and cockpit indicators, and which can, if voice transmission is not elected, be transmitted via narrow band data link using ten percent duty cycle per a/c. It is also obvious that this invention provides a navigation system which permits precise adherence to an assigned time schedule, and which permits precise turn anticipation signals without the "cone of silence" limitations or radial intersection errors inherent in VOR. In addition, it is apparent that this invention provides a navigation system and means therefor by which "virtual fixes" and "virtual route legs" can be quickly established or changed within an entire area of radar coverage without movement of physical equipment.

It should be understood that this invention is not limited to the specific embodiments disclosed herein, and that many modifications can be made therein without departing from the basic teaching of the invention. For example, instead of transmitting a radial error signal RP to the aircraft, the offset distance error signal Do might be transmitted instead. Analog rather than digital techniques might be employed to generate signals Do and DG', and many alternate function generators might be employed as substitutes for the Sander function generator disclosed. These and many other modifications will be apparent to those skilled in the art, and this invention includes all modifications falling within the scope of the following claims.

I claim:

1. A ground controlled system for simultaneously generating aircraft position error signals and for controlling a plurality of aircraft, said system comprising: a computer for generating a plurality of simulated flight signals each representing a respective scheduled flight for an aircraft in fast simulated time; a first error signal generator for receiving the simulated flight signals from said computer and for receiving radar tracking signals to produce first error signals representing the position differences in X and Y coordinates between the simulated flight position and the present actual aircraft position; an along-route error signal generator responsive to said first error signals for producing a second signal representing distance along the schedule route between the projection of the aircraft to the route and the simulated position of the aircraft; means for producing a third signal indicating that said second signal is zero; an offset error signal generator responsive to said first error signal and to said third signal for producing an offset signal representing the distance between the actual aircraft position and the simulated aircraft position when the simulated position is at the foot of a perpendicular drawn from the actual aircraft position to the scheduled aircraft route; and means responsive to said third signal for deriving a schedule error signal indicating the lead or lag time of the aircraft according to its time schedule.

2. A ground computed radial navigation system comprising: first means located at a fixed station for producing route signals representing the scheduled route for an aircraft; each route comprising a plurality of legs, adjacent legs being angular with one another and connected by flight turning portions of the route, the extension of adjacent legs creating a leg intersection; second means located at said fixed station for producing present position input signals representing the present position of an aircraft; third means responsive to said route signals and to said input signals for producing an offset distance signal indicating the perpendicular distance from the aircraft position to its scheduled route; fourth means responsive to said route signals for producing a distance signal representing the distance from the foot of a perpendicular drawn from the aircraft position to the route of the next leg intersection; and fifth means responsive to signals produced by said third and fourth means for generating an output radial error signal representing the radial position error of said aircraft with respect to the next leg intersection.

3. A system for air navigation comprising: first means located at a fixed station for generating route defining signals $X_R$ and $Y_R$ specifying the scheduled flight path for an aircraft, said scheduled flight path comprising individual legs with adjacent legs angularly positioned to each other and intersecting at a corner; second means located at said fixed station for providing radar tracking signals $X_T$ and $Y_T$ representing the actual present position of the aircraft; third means responsive to signals $X_R$ and $Y_R$ and to signals $X_T$ and $Y_T$ for producing an output distance signal $D_0$ representing the distance between the actual aircraft position and its route, said distance being measured along a perpendicular to the route; fourth means for producing a turn distance signal DG' representing the distance from the present aircraft position as specified by $X_T$ and $Y_T$ to the next corner for turning from the present scheduled leg for the aircraft to the next scheduled leg; and means responsive to signals $D_0$ and DG' for generating navigation control signals for use by the pilot of the aircraft to permit the pilot to properly approach, enter, and complete his turn at the next corner so as best to follow the scheduled route.

4. A fixed ground control system adapted to provide aircraft guidance control signals for a plurality of aircraft, said system comprising: a computer for receiving a plurality of scheduled flight path signals corresponding to each aircraft to which guidance control signals are to be provided and for generating ideal flight signals $X_R$ and $Y_R$ representing the movement of each aircraft along a prescribed route on schedules based on fast time; radar tracking means for providing tracking input signals $X_T$ and $Y_T$ representing the actual position of an aircraft to be guided, error signal generator means responsive to signals $X_R$ and $Y_R$ and to signals $X_T$ and $Y_T$ for generating error signals $E_X$ and $E_Y$ representing the differences in X and Y coordinates between signals $X_R$ and $Y_R$ in ideal flight and signals $X_T$ and $Y_T$ in actual flight, and means responsive to signals $E_X$ and $E_Y$ and to a route angle indicating signals $\psi$ for producing an output signal being represented by the function:

$$E_X \sin \psi - E_Y \cos \psi$$

at such time as the following function is satisfied:

$$E_Y \sin \psi + E_X \cos \psi = 0$$

indicating the offset error of each aircraft to be controlled from its corresponding route.

References Cited in the file of this patent

UNITED STATES PATENTS

| | | |
|---|---|---|
| 2,726,039 | Mosher | Dec. 6, 1955 |
| 2,766,953 | Cummings | Oct. 16, 1956 |
| 3,020,545 | Losher | Feb. 6, 1962 |
| 3,028,078 | De George et al. | Apr. 3, 1962 |